US008243547B2

(12) United States Patent
Stewart et al.

(10) Patent No.: US 8,243,547 B2
(45) Date of Patent: Aug. 14, 2012

(54) IDENTIFICATION AND SUPPRESSION OF MULTIPLES IN OCEAN BOTTOM SEISMIC DATA

(75) Inventors: Jonathan Stewart, Houston, TX (US); Andrew P. Shatilo, Houston, TX (US); Tommie D Rape, Houston, TX (US)

(73) Assignee: ExxonMobil Upstream Research Co., Houston, TX (US)

(*) Notice: Subject to any disclaimer, the term of this patent is extended or adjusted under 35 U.S.C. 154(b) by 666 days.

(21) Appl. No.: 12/441,688

(22) PCT Filed: Nov. 15, 2007

(86) PCT No.: PCT/US2007/023824
§ 371 (c)(1),
(2), (4) Date: Mar. 17, 2009

(87) PCT Pub. No.: WO2008/076191
PCT Pub. Date: Jun. 26, 2008

(65) Prior Publication Data
US 2009/0316527 A1    Dec. 24, 2009

Related U.S. Application Data

(60) Provisional application No. 60/875,153, filed on Dec. 15, 2006.

(51) Int. Cl.
*G01V 1/36* (2006.01)
*G01V 1/38* (2006.01)
(52) U.S. Cl. .......................... 367/24; 702/17
(58) Field of Classification Search ............ 367/24; 702/17, 18
See application file for complete search history.

(56) References Cited

U.S. PATENT DOCUMENTS

| 4,881,209 | A | * | 11/1989 | Bloomquist et al. | 367/52 |
| 4,979,150 | A | | 12/1990 | Barr | 367/24 |
| 5,083,297 | A | * | 1/1992 | Ostrander | 367/36 |
| 5,696,734 | A | * | 12/1997 | Corrigan | 367/24 |
| 5,774,417 | A | * | 6/1998 | Corrigan et al. | 367/24 |

(Continued)

OTHER PUBLICATIONS

Duren, R. E. (2003) "A New Summation Technique for Multiple Removal From OBC Data," *SEG Technical Program Expanded Abstracts*, pp. 869-872.

Li, et al. (1999) "Combining Dual-Sensor Data With Pre-Stack Depth Migration—Imaging The Ghost and Primary Reflection at Teal South," *SEG Technical Program Expanded Abstracts*, pp. 1190-1193.

(Continued)

*Primary Examiner* — Isam Alsomiri
*Assistant Examiner* — Ari M Diacou
(74) *Attorney, Agent, or Firm* — ExxonMobil Upstream Research Co. Law Dept.

(57) ABSTRACT

A method for identifying and suppressing water column reverberations ("multiple reflections") in two-component ocean bottom seismic data is disclosed. The method involves processing the hydrophone (P) data and the geophone (Z) data separately to produce two stacked images of the subsurface (21). Analyzing the stacked P-image and the stacked Z-image together can be used to identify multiple reflections (22). Analyzing the stacked /'-image and the stacked Z-image together with an image of the subsurface created from hydrophone and geophone data combined in the usual way (PZ-image) (20) can be used to identify residual multiples in the PZ image (23). The stacked P and Z images can be combined using an existing PZ combination technique to suppress multiples (24). The efficiency of the PZ combination technique at suppressing multiples is increased because of the higher signal-to-noise ratio of stacked data.

14 Claims, 3 Drawing Sheets

U.S. PATENT DOCUMENTS

| | | | | | |
|---|---|---|---|---|---|
| 5,825,716 | A | * | 10/1998 | Starr | 367/24 |
| 6,151,275 | A | | 11/2000 | Starr | 367/57 |
| 6,678,207 | B2 | * | 1/2004 | Duren | 367/24 |
| 2003/0048696 | A1 | * | 3/2003 | Duren | 367/24 |
| 2005/0207278 | A1 | | 9/2005 | Reshef et al. | 367/38 |

OTHER PUBLICATIONS

*European Standard Search Report*, dated 6 Jun. 2007 (RS 114855).
*PCT International Search and Written Opinion*, dated May 14, 2008, 10 pages.

\* cited by examiner

IDENTIFICATION AND SUPPRESSION OF MULTIPLES IN OCEAN BOTTOM SEISMIC DATA

This application is a National Stage entry under 35 U.S.C. 371 of PCT/US2007/023824 that published as WO 2008/076191 and was filed on Nov. 15, 2007 and claims the benefit of U.S. Provisional application 60/875,153 which was filed on Dec. 15, 2006.

FIELD OF THE INVENTION

The invention relates generally to the field of geophysical prospecting, and more particularly to seismic data processing and interpretation. Specifically, the invention is a method for identifying and suppressing multiple reflections in ocean bottom seismic ("OBS") data.

BACKGROUND OF THE INVENTION

Seismic data collected in the marine environment are often contaminated by multiple reflections. The desired data come from once-reflected seismic waves, where the reflection occurs at a subsurface (water bottom or below) reflector. Waves that reflect one or more additional times off the air-water interface or any other reflector (i.e., "multiples") confuse the data interpretation and thus constitute unwanted noise when detected and recorded at a survey receiver along with the once-reflected data. Removal of multiples is often incomplete because the algorithm employed to remove the multiples is ineffective. As a result, the seismic image generated from the data is degraded; and incompletely removed (i.e., "residual") multiple energy may be confused with the true seismic image.

The present invention concerns the processing and analysis of OBS data for the identification and suppression of multiples. Of specific concern is the identification and suppression of a common type of multiple that arises from reverberation of seismic energy within the water column. FIG. 1 illustrates an example of a common type of such a multiple reflection 19. In FIG. 1, a seismic source 11 emits an acoustic wave indicated by ray 13 which is reflected off some interface 16 located in the subsurface below the sea floor 17. The reflected wave is detected by hydrophone 14 and by geophone 15 receivers located on the sea floor. This is called the primary reflection, and its detection by the receivers constitutes the desired gathering of information. However, the upcoming wave 13 will continue upward through the water column 18 to be reflected by the air water interface 12 back down toward the receivers and recorded at a later time than the primary reflection. The time delay between the recording of the primary and the multiple is equal to the time taken for the seismic energy to travel through the water column. Thus, multiple reflections interfere with later arriving primary reflections generated by deeper subsurface reflectors. Diminishing amounts of this multiple energy will continue to reverberate 19 in the water column between the sea floor and surface, and will be recorded as unwanted noise appearing on top of and tending to mask the desired primary reflection detections.

In ocean bottom seismic surveys, instead of being towed along with the seismic source by a vessel, the survey receivers are placed on the ocean bottom in stationary locations. As used herein, the term ocean bottom seismic, or OBS, includes the common practice of installing receivers in cables strung along the ocean floor (called ocean bottom cable or "OBC") as well as receivers installed as isolated nodes on the sea floor.

OBS surveys are sometimes two component ("2C") meaning that they contain hydrophone and vertical geophone receivers. Sometimes they are four component ("4C") meaning that they contain hydrophone and three (vertical and two horizontal) geophone receivers. Accordingly, as used herein, "2C" will be understood not to exclude the possibility of additional geophones at a receiver location, measuring additional components.

One of the main advantages of two component ("2C") OBS seismic is an ability to record a propagating wave using both vertical geophone ("Z-component") and hydrophone ("P-component"). The hydrophone measures the pressure in the water column, a scalar property which, therefore, is not sensitive to direction of the wave propagation. The vertical geophone measures the vertical component of the particle motion (for example, velocity or acceleration) of the seafloor (a vector property) and is, therefore, sensitive to the propagation direction. Alternatively, MEMS receivers (Micro-Electro Mechanical Systems) may be used instead of geophones to supply the vector signal. The directional sensitivity of the OBS system allows discrimination of upgoing (including the signal component) and downgoing (including water column multiples) seismic events. In particular, the hydrophone and geophone may be arranged such that the upgoing energy is measured with the same polarity on the two detectors, whereas downgoing energy is measured with opposite polarity. This effect provides the basis for attenuating water column reverberations using OBS hydrophone and geophone combinations, so-called "PZ-combinations" (e.g., U.S. Pat. No. 6,678,207 to Duren). General industry practice is to perform this combination of hydrophone and geophone data before stacking of the data (i.e., early in the processing flow). For instance, Corrigan (U.S. Pat. No. 5,696,734) teaches application of the combination using common-receiver gathers of seismic data.

However, one of the major limitations of such pre-stack combinations of hydrophone and geophone data arises from the fact that pre-stack data have a low signal-to-noise ratio. Thus, the effectiveness of combination techniques, that require signal estimation or analysis, may be reduced. A major purpose of stacking seismic traces from different records is to increase signal relative to noise by cancellation of random noise.

Many 2C OBS combination methods require an estimate of the water-bottom reflection coefficient. Because this information is difficult and costly to acquire, and required as a function of offset for pre-stack combination, the effectiveness of many 2C OBS combination methods may be compromised. However, in Duren's method (U.S. Pat. No. 6,678,207), the water-bottom reflection coefficient is not required; it is internally estimated.

Another limitation of most 2C OBS combinations is the requirement of proper scaling of geophone and hydrophone signals and matching of the P and Z wavelets. Those skilled in the art will recognize this as a difficult part of the process.

A common result of the imperfect combination of OBS hydrophone and geophone data arising from these limitations is a degraded seismic image and the presence of residual multiple energy on the combined PZ image. This energy may be confused with true seismic image.

Furthermore, the identification of multiples on images by those skilled in the art is not straightforward. A common method for identifying multiples relies primarily on visual analysis. Strong multiples often have a different character (amplitude, orientation, periodicity) than true seismic energy. However, weak residual multiples are often very similar in character to primary energy. As described above, multiples are related to their generating primary event by a time approximately equal to the two-way travel time to the water bottom. A rudimentary way of identifying multiples is, therefore, to add the two-way travel time of the water bottom to the time of the generating primary event and look for correspondence between the 'phantom' horizon thus created and seismic reflections. Such techniques for multiple identification are subjective and qualitative.

Li et al. ("Li") suggest producing separate images from the up-going and down-going parts of a wavefield separately using pre-stack depth migration. ("Combining dual-sensor data with pre-stack depth migration—Imaging the ghost and primary reflection at Teal South," *SEG Technical Program Expanded Abstracts*, 1190-1193 (1999)) Then, they propose combining the four separate images thus produced (after "calibration of the four separate migration images"), with the objective of suppressing multiples in order to improve the primary image. Li's approach and that of the present invention combine hydrophone and geophone data post-stack, which differs from conventional approaches.

In Li's method, four seismic images are produced from: (1) up-going wavefield based on vertical geophone data; (2) down-going wavefield based on vertical geophone data; (3) up-going wavefield based on hydrophone data; and, (4) down-going wavefield based on the hydrophone data. Li uses conventional imaging for two of the four images they produce (the up-going); the other two (down-going) are obtained using "mirror" imaging, i.e., imaging from fictitious receiver elevations.) What the authors call "incorrectly imaged energy" remains, i.e., down-going energy that appears below the correct image of the reflector on the up-going image and up-going energy that appears above the correct image of the reflector on the down-going image. This energy is partly attenuated using a stack of the four separate images.

Li's method accounts only for the first order water column reverberations. The authors note, "imaging the reverberations that undergo more than a single pass through the water column . . . require[s] more complicated treatment". Furthermore, in separating the "primaries" and the "incorrectly imaged energy", the method relies on kinematic (i.e., moveout) differences between the two (not amplitudes). Thus the effectiveness of Li's method depends greatly on water depth. The authors note this in their paper: "How much we can benefit from using down-going image of the ghost depends on the water depth." Li's method is thus a post-stack combination of 2C OBS data that requires production of four images of the subsurface: two of the up-going wavefield and two of the down-going wavefield.

For the above-described reasons, an improved method of identifying and correcting OBS data for multiples is needed. The present invention satisfies this need.

SUMMARY OF THE INVENTION

In one embodiment, the invention is a method for distinguishing primary reflections from multiple reflections in multicomponent ocean bottom seismic data, said multiple components including a pressure sensitive receiver measuring "P" data and a vertical directional motion detecting receiver measuring "Z" data, said method comprising:
(a) processing to produce a stacked image of the P data, both up-going and down-going data together; and
(b) processing to produce a stacked image of the Z data, both up-going and down-going data together; and
(c) using the stacked image of the P data and the stacked image of the Z data to distinguish primary reflections from multiple reflections;

wherein the processing may be done by a human or a computer.

One way to identify multiple reflections upon comparing the stacked image of the P data and the stacked image of the Z data is to apply the following two, generally true, criteria:
  (i) a multiple reflection will register stronger in the P data than in the Z data; and
  (ii) a multiple reflection stronger than a selected threshold will have opposite polarity in the P data as compared to the Z data.

BRIEF DESCRIPTION OF THE DRAWINGS

The present invention and its advantages will be better understood by referring to the following detailed description and the attached drawings in which:

FIGS. 3A-D are seismic images of data from an actual OBC survey, wherein FIG. 3A is an image from a pre-stack combination of the hydrophone and geophone data, i.e. the traditional approach used with such data; FIG. 3B is an image from the hydrophone data; FIG. 3C is an image from the geophone data; and FIG. 3D shows the image from the post-stack combination of the hydrophone and geophone data according to the present inventive method.

Figure 1:
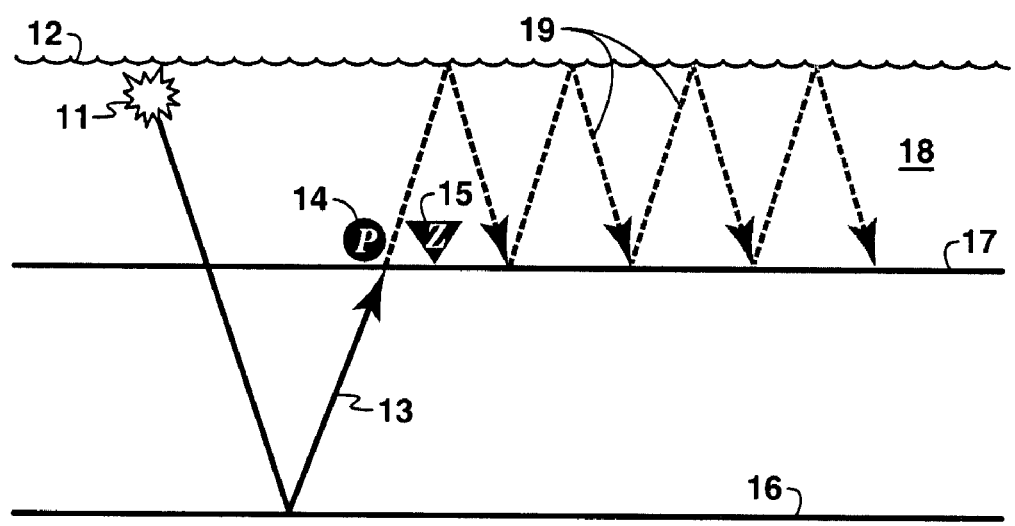
FIG. 1 is a diagram showing multiple reflections reverberating in the water column.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

The present invention is based in part on the following knowledge about the characteristics of multiples on hydrophones and geophones (see, e.g., Duren, R. E., "A new summation technique for multiple removal from OBC data," *SEG Technical Program Expanded Abstracts*, 869-872 (2003)):
  i) Multiples on the hydrophone data are stronger than multiples on the geophone data. The amplitude of downgoing energy (i.e., multiples) is proportional to 1+R and 1−R on the hydrophone and geophone respectively, where R is the water bottom reflection coefficient (R>0 in most situations).
  ii) Relatively strong multiples on the hydrophone and geophone are of opposing polarity.

These two observations are well known, in theory, for an isolated reflector and a uniform medium. In practice, these conditions are never perfectly met and interference effects complicate matters. Nevertheless, according to the present invention, they provide a basis for identifying multiples. Other distinguishing criteria may be known to persons who work in the field. For example, autocorrelation functions may be calculated from the images. Secondary extrema in the autocorrelations with times corresponding to the water bottom two-way traveltime may be taken to indicate presence (and relative intensity) of water bottom reverberations. It should also be noted that criterion (i) above may not apply if the water-bottom reflection coefficient is negative. The main steps in the invention are outlined in the flow chart of FIG. 2 and described further below.

Separate Processing of the OBS Hydrophone and Geophone Data Sets to Produce Two Images of the Subsurface (Step 21)

As described above, it is typical practice 20 to combine OBS hydrophone and geophone data early in the processing flow (before stack). In the present inventive method, the OBS hydrophone and geophone data are not combined (24) until after stacking (stacking is part of the "process" operation). Although any traditional seismic data processing method may be used in step 21, the following features, common in seismic processing flows, are included in 21 in a preferred embodiment of the invention to help ensure that the effectiveness of the analysis and combination of the resultant data sets (alternative approaches indicated in steps 22-24) are not affected:

i) the processing should result in similar seismic wavelets on the OBS hydrophone and geophone images;
ii) noise suppression to improve the signal-to-noise ratio of the data is applied (a different level of noise suppression may be required on each of the data sets);
iii) imaging of the separate data sets is performed using the most appropriate imaging algorithm for the situation, which may include, but is not limited to, common midpoint (CMP) stack, dip move-out, pre- or post-stack time or depth migration.

In feature (iii), the most appropriate imaging algorithm is to be determined based on normal processing considerations; e.g., the choice of imaging algorithm may depend on the complexity of the geologic structure and velocity field, the signal-to-noise ratio and the acquisition geometry, and other factors. The output after processing will be two separate images (labeled "P image" and "Z image" in FIG. 2) of the subsurface derived from the OBS hydrophone and geophone data.

Joint Analysis of the Separate OBS Hydrophone and Geophone Images to Identify Multiples (Step 22)

The identification of multiples from the OBS hydrophone and geophone images may be as simple as a visual comparison, using the basic properties of the multiples outlined above. Thus the recognition criteria for multiples on OBS data are (1) stronger amplitude for hydrophone data compared to geophone data, and (2) opposite polarity on hydrophone and geophone data. Visual inspection, using these criteria, comprises the preferred technique for identifying multiples.

Automatic techniques to enhance the identification of multiples that take advantage of these criteria may also be considered. For example, another seismic image, derived from the OBS hydrophone and geophone images could be created using simple logic to indicate all time-samples where the hydrophone and geophone are of opposing polarity, and therefore likely to show the location of multiples.

Combination of the Separately Processed Hydrophone and Geophone Data Sets Using a Suitable Combination Algorithm to Remove Multiples (Step 24)

Next (at 24), after generating separate P and Z stacked images but before the application of any further processing, the OBS hydrophone and geophone data sets may be combined. The combination algorithm proposed by Duren in U.S. Pat. No. 6,678,207 is a preferred way to combine the data sets. However, other OBS combination methods will be known to persons of ordinary skill in the field, and may be used instead; e.g. see U.S. Pat. No. 4,979,150 to Barr or U.S. Pat. No. 5,696,734 to Corrigan. The combine part of step 24 is not a simple arithmetic operation, as the OBS artisan will understand. The skilled artisan will further understand and appreciate that proper scaling of the OBS hydrophone and geophone data as well as matching of P and Z wavelets are important for optimal combination. A PZ combination algorithm designed for 2C OBS data will have these features and will be designed to correct the data to suppress multiples. Such an algorithm is to be used in the combine step at 24 in the present invention, and would be used as well in the combine step at 20 in FIG. 2.

The suppression of multiples using the present invention operates on post-stack data. Post-stack data generally have a higher signal-to-noise ratio than pre-stack data. Therefore, a post-stack combination method may attenuate water column reverberations more efficiently than a pre-stack combination method. The previously mentioned method of Li et al. also uses a post-stack combination. However, Li combines four images and their combination method is different. Li does not disclose what combination method is used other than noting that calibration of the separate images is required. Their combination technique seemingly could not be a two-component Ocean Bottom Seismic P-Z multiple suppression combination technique, which the present inventive method uses, because such methods operate on P and Z data only, not on four data sets. Li uses conventional imaging (source and receiver at their true elevations) to produce an image from the two upgoing wavefields (that based on vertical geophone data, and that based on hydrophone data). To produce an image from the two down-going wavefields (that based on vertical geophone data and that based on hydrophone data), Li uses "mirror" imaging (from fictitious receiver elevations). Additional processing steps must therefore be carried out in the Li method to create the image from the down-going wavefield. In contrast, the present inventive method uses only conventional imaging to produce two images and a PZ combination method to combine them.

An alternative use of multiple identification by the present inventive method is to determine if reflections in pre-stack combined OBC PZ data, i.e. data generated by the traditional approach 20, are weak residual multiples or weak true primaries. This is indicated at 23 in FIG. 2. This will assist interpretation of pre-stack combined 2C-OBS data. The term residual multiples is used at 23 because multiple suppression within a typical approach 20 is usually not perfect.

EXAMPLES

Figure 3A:
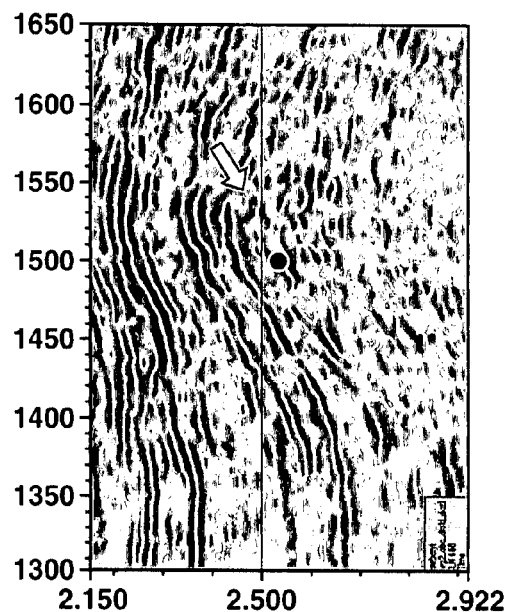

FIGS. 3A-D provide an example of the present inventive method applied to actual OBC data. FIGS. 3A-3D are seismic sections, i.e. a plot of seismic data along a horizontal line. The vertical axes show depth in meters, and the horizontal axes represent position along the line in kilometers. FIG. 3A shows an image from a pre-stack combination of OBC hydrophone and geophone data, i.e., the traditional approach used with 2C OBS data. The reader's attention is directed to the arrow in FIG. 3A, and the prominent marker dot that the arrow points toward. The weak seismic reflection indicated by the dot could be considered a multiple, but equally it could be considered a true seismic reflection. The present inventive method will identify this as a multiple and enable its suppression, as illustrated in the succeeding drawings.

Figure 2:
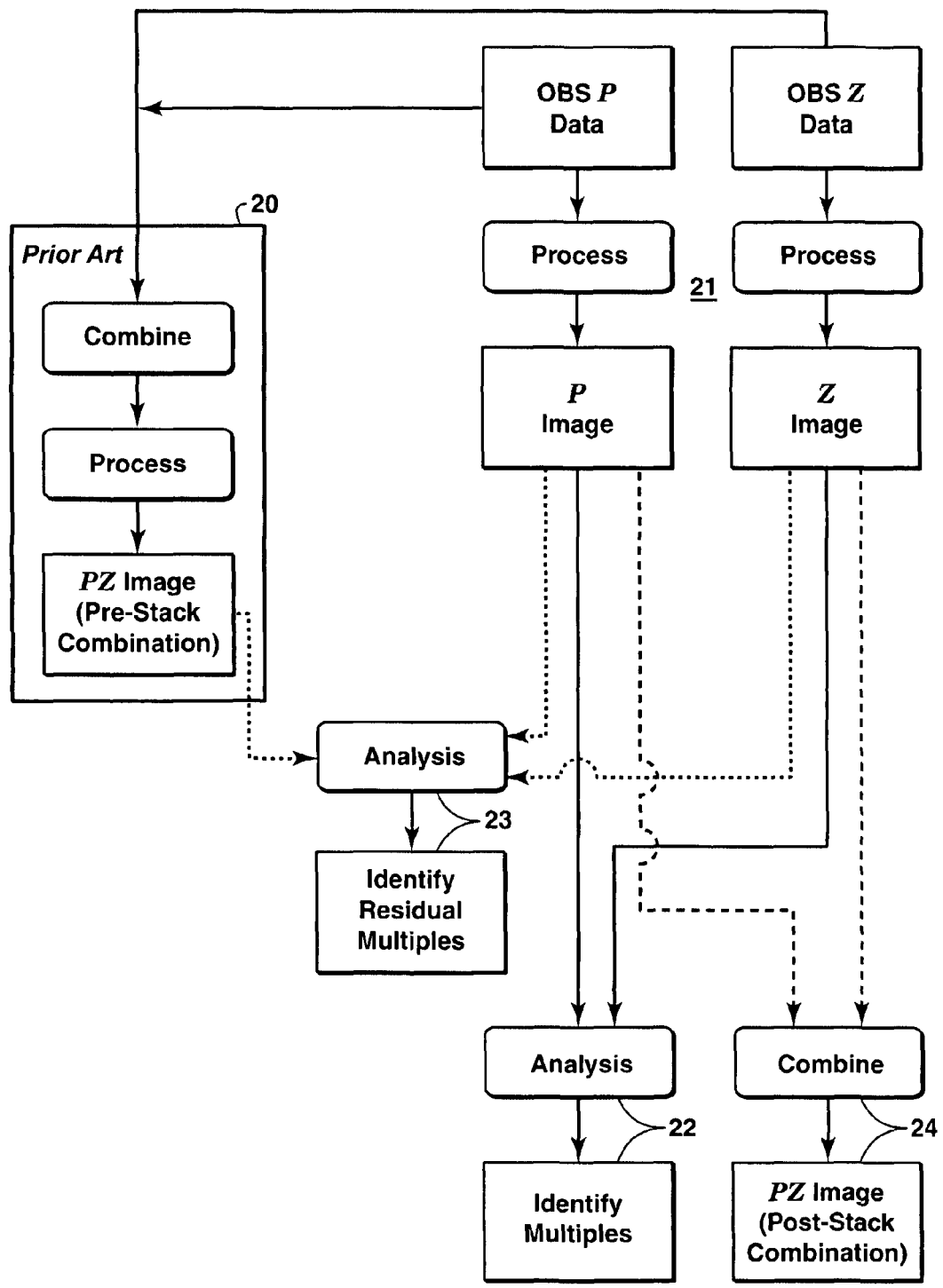
FIG. 2 is a flow chart comparing traditional processing of 2C OBS data with various embodiments of the present inventive method.
Figure 3B:
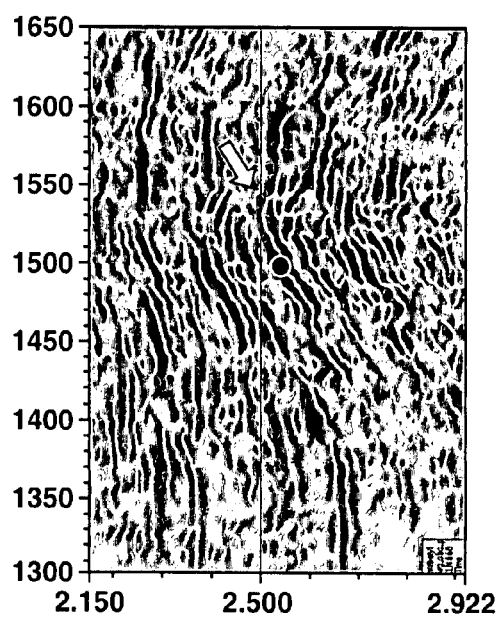
Figure 3C:
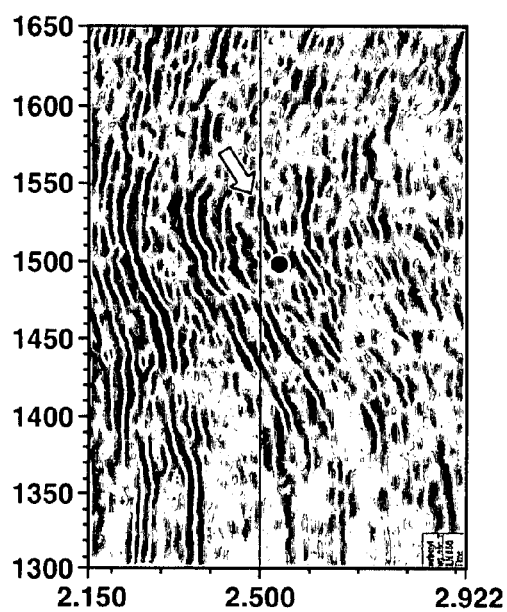

FIG. 3B shows the image from OBC hydrophone data (the "P image" on the flowchart of FIG. 2). The seismic reflection at the marker dot is continuous with strong negative amplitude. (Such a display would typically use color to represent amplitude and polarity. The prominent reflection just below the marker dot has a positive amplitude, although this cannot be discerned from the black and white reproduction of the data display.) FIG. 3C shows the image from OBC geophone data (the Z image on FIG. 2). The seismic reflection at the marker dot is continuous with weak positive amplitude. The combination of opposing polarity and weaker amplitude on the geophone data compared to the hydrophone data identify this seismic reflection as a multiple.

Figure 3D:
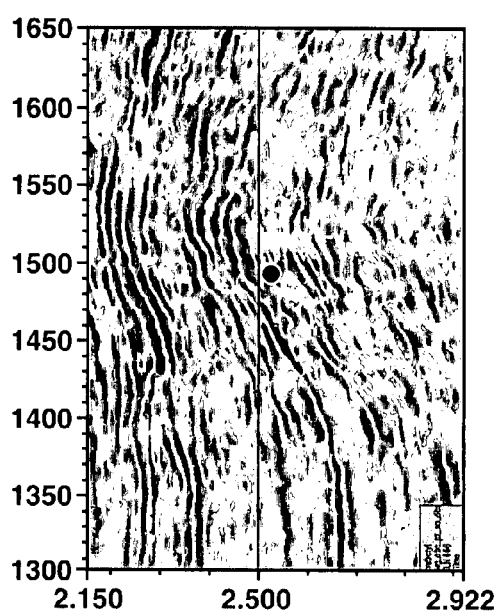

FIG. 3D shows the image from post-stack combination of hydrophone and geophone data, corresponding to the "PZ image (post-stack combination)" box at 24 in FIG. 2. The multiple is better removed on this seismic image than on FIG. 3A, illustrating the effectiveness of post-stack combination method for multiple suppression.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for distinguishing primary reflections from multiple reflections in multicomponent ocean bottom seismic data, said multiple components including a pressure sensitive receiver measuring P data and a vertical directional motion detecting receiver measuring Z data, said method comprising:
   (a) processing to produce a stacked image of the P data, both up-going and down-going data together; and
   (b) processing to produce a stacked image of the Z data, both up-going and down-going data together; and
   (c) using only two images, the stacked image of the P data and the stacked image of the Z data, to distinguish primary reflections from multiple reflections;
wherein all processing to produce a stacked image is performed using a computer.

2. The method of claim 1, wherein step (c) comprises combining the stacked image of the P data and the stacked image of the Z data using a two-component Ocean Bottom Seismic P-Z multiple suppression combination technique that scales the stacked imaged P data to the stacked imaged Z data and matches their wavelets.

3. The method of claim 1, wherein step (c) comprises identifying multiple reflections based on amplitude and polarity differences between the two stacked images.

4. The method of claim 3, further comprising using the multiple reflections identified in step (c) to identify residual multiples in a pre-stack combination of the P and Z data.

5. The method of claim 3, wherein the amplitude and polarity differences include the following assumed properties of multiple reflections:
   (i) a multiple reflection will register stronger in the P data than in the Z data; and
   (ii) a multiple reflection stronger than a selected threshold will have opposite polarity in the P data as compared to the Z data.

6. The method of claim 1, wherein the processing in steps (a) and (b) is performed subject to a criterion of producing substantially matching seismic wavelets in the P and Z images.

7. The method of claim 1, wherein the processing in steps (a) and (b) includes noise suppression.

8. The method of claim 1, wherein the imaging of the P and Z data sets is performed using a method selected from a group consisting of common-midpoint stack, dip move-out, pre-stack time migration, pre-stack depth migration, post-stack time migration, and post-stack depth migration, said selection being based on considerations of complexity of geologic structure and velocity field, signal-to-noise ratio, and acquisition geometry.

9. The method of claim 2, wherein the technique for combining the stacked imaged P data and the stacked imaged Z data internally estimates water-bottom reflection coefficient, which therefore is not required as input information.

10. The method of claim 1, wherein the ocean bottom seismic data are obtained from an ocean bottom cable survey.

11. The method of claim 1, wherein the ocean bottom seismic data are obtained from a survey wherein receivers are installed as isolated nodes on the sea floor.

12. The method of claim 1, wherein the pressure sensitive receivers are hydrophones and the directional motion detecting receivers are geophones.

13. A method for producing hydrocarbons from a below sea floor region, comprising:
   (a) conducting a multicomponent, ocean bottom seismic survey of the below sea floor region, said multiple components including a pressure sensitive receiver measuring P data and a vertical directional motion detecting receiver measuring Z data;
   (b) obtaining seismic images of the below sea floor region made by processing and migrating data from the survey wherein multiple reflections were identified or removed from the data by a method comprising:
      (i) processing to produce a stacked image of the P data, both up going and down-going data together; and
      (ii) processing to produce a stacked image of the Z data, both up-going and down-going data together; and
      (iii) using only two images, the stacked image of the P data and the stacked image of the Z data, to distinguish primary reflections from multiple reflections;
   (c) drilling a well into a layer below the sea floor identified in the primary reflections in the seismic images as a potential hydrocarbon reservoir; and
   (d) producing hydrocarbons from the well.

14. The method of claim 1, wherein the method is used to distinguish, in a like manner, both first order multiple reflections and higher order multiple reflections from primary reflections.

* * * * *

UNITED STATES PATENT AND TRADEMARK OFFICE
CERTIFICATE OF CORRECTION

PATENT NO. : 8,243,547 B2  Page 1 of 1
APPLICATION NO. : 12/441688
DATED : August 14, 2012
INVENTOR(S) : Jonathan Stewart, Andrew P. Shatilo and Tommie D. Rape It is certified that error appears in the above-identified patent and that said Letters Patent is hereby corrected as shown below:

In the Abstract:

Line 8, replace "/'-image" with --P-image--.

Signed and Sealed this
Twenty-third Day of October, 2012

David J. Kappos
*Director of the United States Patent and Trademark Office*